(12) United States Patent
del Castillo et al.

(10) Patent No.: US 6,539,207 B1
(45) Date of Patent: Mar. 25, 2003

(54) COMPONENT FOR A WIRELESS COMMUNICATIONS EQUIPMENT CARD

(75) Inventors: Francisco Javier del Castillo, New York, NY (US); Eduard M. Kogan, Howard Beach, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 395 days.

(21) Appl. No.: 09/604,202

(22) Filed: Jun. 27, 2000

(51) Int. Cl.⁷ .................................................. H04B 1/38
(52) U.S. Cl. ..................... 455/90; 455/117; 455/128; 455/347; 455/558; 343/702; 343/841; 361/752; 379/433.09; 379/433.11
(58) Field of Search ........................... 455/90, 117, 128, 455/129, 347, 351, 562, 575, 557, 558; 343/700 MS, 702, 841; 379/433.11, 433.09; 361/748, 752, 753, 724

(56) References Cited

U.S. PATENT DOCUMENTS

| | | | | |
|---|---|---|---|---|
| 5,519,577 A | * | 5/1996 | Dudas et al. | 455/347 |
| 5,918,163 A | * | 6/1999 | Rossi | 455/90 |
| 6,282,101 B1 | * | 8/2001 | Hanas et al. | 361/752 |
| 6,295,031 B1 | * | 9/2001 | Wallace et al. | 343/702 |

* cited by examiner

*Primary Examiner*—Quochien Vuong
(74) *Attorney, Agent, or Firm*—Kirschstein, et al.

(57) ABSTRACT

A grounded, shielded holder for a radio frequency communications card installed in a terminal used in a wireless network includes a built-in antenna for transmitting and receiving radio frequency signals to and from the card. The antenna is formed from the material of the holder itself.

15 Claims, 2 Drawing Sheets

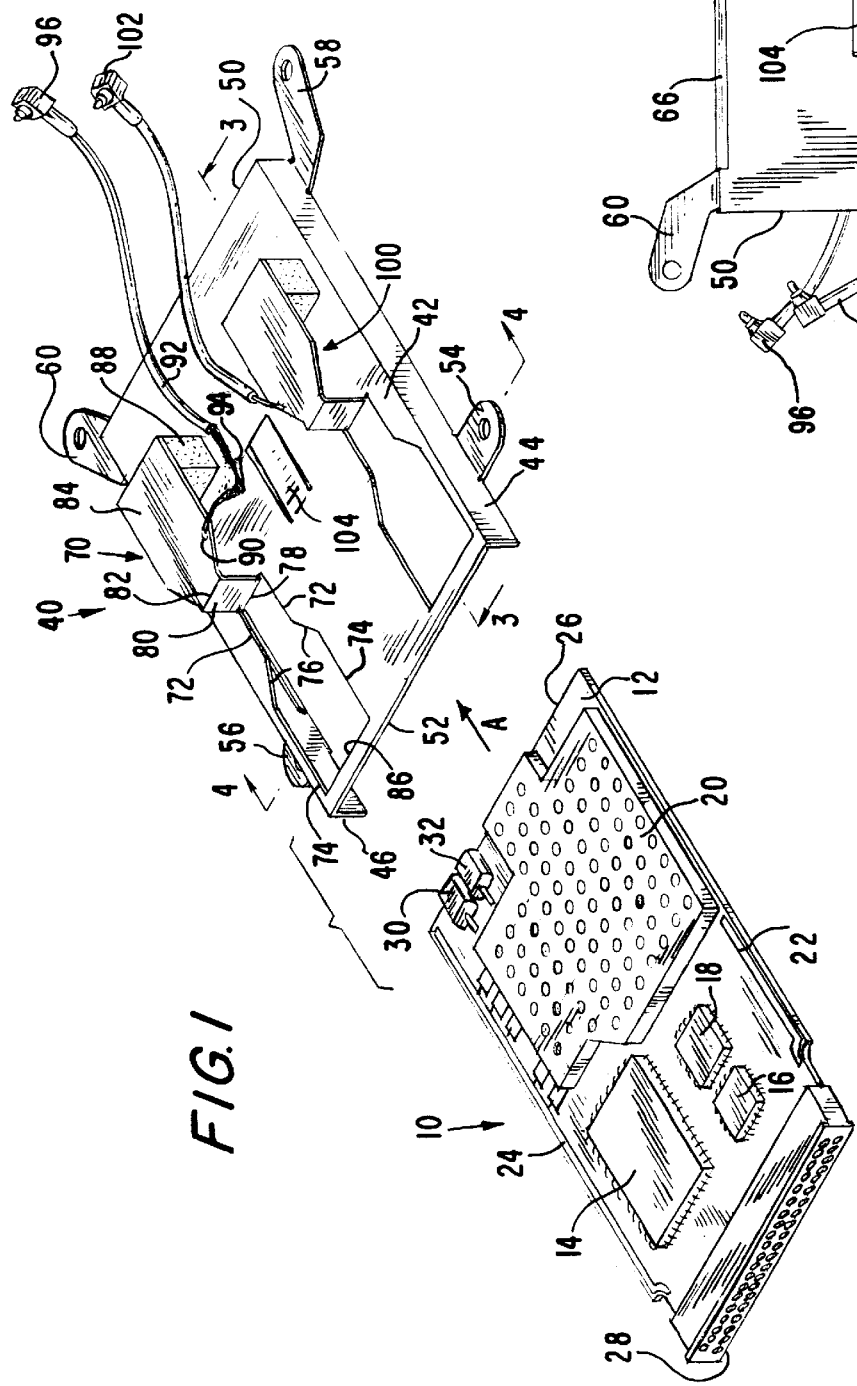

COMPONENT FOR A WIRELESS COMMUNICATIONS EQUIPMENT CARD

BACKGROUND OF THE INVENTION

1. Field of the Invention

The present invention generally relates to wireless local area networks and portable or mobile communications equipment such as telephones, computers, personal digital assistants, pagers, and data collection and roaming terminals, as well as stationary equipment such as fixed access points or base stations and, more particularly, to improvements in holding, shielding, grounding and transmitting/receiving radio frequency signals for a communications equipment card used in such mobile and/or stationary equipment.

2. Description of the Related Art

Wireless local area networks use radio frequency (RF) communications channels to communicate between communications equipment. Each equipment may be a portable or mobile terminal or station, such as a telephone, computer, personal digital assistant, pagers, and data collection and roaming terminal, or a stationary terminal or station, such as a fixed access point or base station. Typically, a multitude of mobile terminals communicate with a plurality of stationary terminals such as host computers. The stationary terminals are, in turn, connected by a wired or wireless channel to a network infrastructure.

Wireless and RF protocols are known which support the logical interconnection of portable terminals having a variety of types of communication capabilities to stationary terminals. The logical interconnections are based upon an infrastructure in which at least some of each of the portable terminals are capable of communicating with at least two of the stationary terminals when located within a predetermined range therefrom, each portable terminal being normally associated and in communication with a single one of such stationary terminals. Based on the overall spatial layout, response time, and loading requirements of the network, different networking schemes and communications protocols have been designed so as to most efficiently regulate the communications.

One such protocol is set forth in the IEEE Standard 802.11 entitled "*Wireless LAN Medium Access Control (MAC) and Physical Layer (PHY) Specifications*" available from the IEEE Standards Department, Piscataway, N.J., (hereinafter, the "IEEE 802.11 standard"). The IEEE 802.11 standard is directed to wireless local area networks, and in particular specifies the MAC or the data link layer and the PHY or physical link layer. These layers are intended to correspond closely to the two lowest layers of the ISO Basic Reference Model of OSI, i.e., the physical layer and the data link layer. The IEEE 802.11 standard permits communications, at 1 Mbps, 2 Mbps and higher data rates, a medium access technique similar to carrier sense multiple access/collision avoidance (CSMA/CA), a power-save mode for battery-operated mobile stations, seamless roaming in a full cellular network, high throughput operation, diverse antenna systems designed to eliminate "dead spots", and an easy interface to existing network infrastructures.

The current implementations of commercial wireless local area networks utilize a transceiver operating in the 2.4 to 2.4835 GHz spread spectrum band which is the industrial, scientific, and medical (ISM) band allocated for unlicensed use by the U.S. Federal Communications Commission. The current systems utilize one of two basic types of spread spectrum modulation: direct-sequence and frequency-hopping.

In a direct-sequence spread spectrum (DSSS) system, each binary bit of data in a data signal is spread over each of 11 discrete frequency channels at the same time, i.e., an 11-bit pseudorandom noise (PN) code. The data of each user is coded using a different PN code so that the signals of different users are orthogonal to each other. Thus, another user's signal is merely interpreted as noise. The IEEE 802.11 standard provides two modulation formats and data rates in the DSSS system—a basic access rate using differential binary phase shift keying (DBPSK) modulation operating at 1 Mbps, and an enhanced access rate using differential quadrature phase shift keying (DQPSK) modulation operating at 2 Mbps.

In a frequency-hopping spread spectrum (FHSS) system, each binary bit of data in the data signal is associated with a group of distinct "chips", or discrete signal frequency output, in different parts of a frequency band, with a minimum hop of at least 6 MHz (in North America/Europe). The chipping pattern or hopping sequence is a pseudo-random sequence uniformly distributed throughout the band and set forth in the IEEE 802.11 standard. Each access point executes a unique hopping pattern across 79 non-overlapping frequencies at a rate of one hop every 100 milliseconds. There are three sets of hopping patterns specified in the IEEE 802.11 standard for North American/European operations, with each set containing 26 sequences. The sets are selected to minimize the possibility of interference. The RF modulation technique used in the FHSS system is 2-level or 4-level Gaussian-filtered frequency shift keying (GFSK). Frequency-hopping spread spectrum systems are currently preferred over direct sequence for most applications by the majority of users as they allow increased capacity and decreased interference. The FHSS system hops over channels with an effective raw data rate of 1 Mbps or 2 Mbps. Current commercial systems can typically cover from an area of 25,000 to 70,000 square feet with a process gain of 10 dB. The relatively low power output used in such systems is a consequence of limits placed by regulatory agencies. Power output standards currently in effect limits the power output to either 100 mW, 230 mW, or 500 mW depending on the country.

In a spread spectrum system, one can multiplex users by assigning them different spreading keys. Such a system is called a code division multiple access (CDMA) system. Most wireless local area network products are not CDMA systems since users belonging to the same wireless local area network utilize the same spreading key. Instead, as noted above, the media access protocol (MAC) set forth in the IEEE 802.11 standard provides that use access to the channel is multiplexed in time using nearly the same Carrier Sense Multiple Access (CSMA) protocol as in the Ethernet.

Each of the aforementioned terminals utilize a communications equipment card which essentially comprises a radio frequency transceiver circuit for implementing the desired RF protocol, and an antenna, especially the classical λ/4 monopole antenna as typified by the whip antenna. For increased miniaturization and sensitivity to electro-magnetic fields, inverted L- and F-antennas have been proposed to replace the monopole antenna.

The known antennas are connected to the transceiver circuits by being mounted on printed circuit boards that carry the circuits, by being loosely connected by cables or end caps, or by being encapsulated in shielded housings. Such methods are disadvantageous because they increase the occupied space factor and are therefore unsuitable for applications where a high degree of miniaturization is desired.

SUMMARY OF THE INVENTION

OBJECTS OF THE INVENTION

Accordingly, it is a general object of this invention to provide a highly suitable, miniaturized communications equipment component capable of performing multiple functions previously performed by multiple components.

Still another object of the present invention is to enable a single component to hold a radio frequency communications card, to shield the card from electro-magnetic interference, to transmit/receive radio frequency signals with a built-in antenna, and to serve as a ground plane for the antenna.

A still further object of the present invention is to reduce manufacturing and assembly costs for such components.

FEATURES OF THE INVENTION

In keeping with the above objects and others which will become apparent hereafter, one feature of the present invention resides in a component for a radio frequency communications card, comprising a holder constituted of an electrically conductive material, such as sheet metal, for holding and shielding the card from radio frequency interference. The holder has a main portion lying in a plane which extends over the card and a pair of side portions integral with the main portion and extending over the side edges of the card. The main and side portions bound a compartment in which the card is slidably received and held. An end portion abuts against a leading edge of the card in a fully received, held position for the card. A plurality of mounting portions on the side portions are used for fixing the position of the holder in a communications equipment.

The component includes a built-in antenna constituted of the same material as, and being of one-piece with, the holder, and is operative for transmitting/receiving radio frequency signals to and from the card. The antenna is formed from the main portion itself. Specifically, an antenna portion is cut or stamped out of the main portion, but not completely removed therefrom. The antenna portion is bent out of the plane of the main portion and leaves behind a cutout that extends through the main portion. Preferably, the antenna portion has a first part extending generally perpendicularly to the main portion, a second part extending generally parallel to the main portion, and a feeding point connected to the main portion and to the second part, thereby configuring the antenna as an F-antenna.

The holder includes a grounding contact for grounding the holder and enabling the plane of the main portion to serve as a ground plane for the antenna. At least one of the side portions and the end portion, and preferably each of the side and end portions of the holder, is provided with the grounding contact which extends along the respective side and end portion and makes contact with a grounded area on the card.

In the preferred embodiment, two F-antennas are formed side-by-side in the main portion. A resilient tongue between the antennas resiliently bears against the card for a more secure holding and grounding of the card.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a perspective, exploded view of a component according to this invention and a communications card prior to its introduction into the component;

FIG. 2 is a bottom plan view of the component of FIG. 1;

DETAILED DESCRIPTION OF THE PREFERRED EMBODIMENTS

Figure 3:
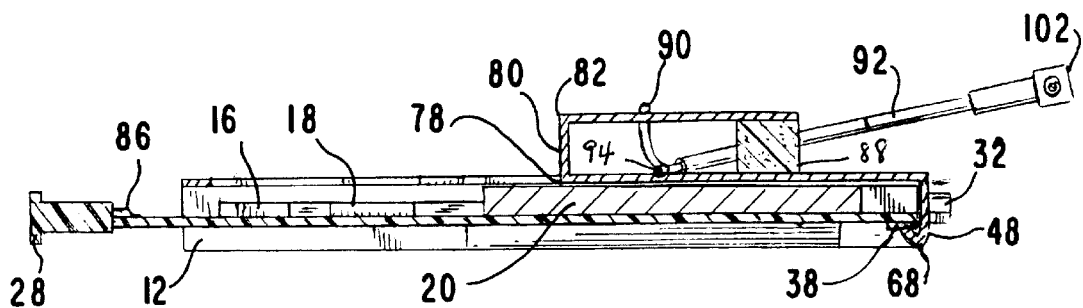
FIG. 3 is a sectional view taken on line 3—3 of FIG. 1 after the introduction of the card.

Referring now to the drawings, reference numeral 10 generally identifies a communications card having a printed circuit board 12 and a radio frequency transceiver circuit thereon. The transceiver circuit executes the RF protocol described above, especially the IEEE 802.11 standard, and includes a plurality of integrated circuit chips identified by reference numerals 14, 16, 18 which are visible on an upper surface of the board in FIG. 1, and additional chips located underneath a perforated cover plate 20 that at least partly shields the chips underneath the cover plate from radio frequency interference, as well as still more chips on the opposite, lower surface of the board. The connections among the chips have not been illustrated so as not to encumber the drawing.

FIG. 1 also shows grounded areas or conductive strips 22, 24 extending along the opposite sides of the upper surface of the board. Similar conductive strips 34, 36 extend along the opposite sides of the lower surface of the board. Another conductive strip 38 extends transversely across the lower surface of the board at a leading end 26 of the card. A multi-pin connector 28, such as a sixty-eight pin PCMCIA connector, which serves as a handle, is located at a trailing end of the card. A pair of antenna connectors 30, 32 is mounted and accessible at the leading end 26 of the card.

In accordance with this invention, a multi-functional component 40 performs various electrical and mechanical functions for the card 10. The component 40 is, first of all, a holder for receiving the card 10 slidably inserted in a longitudinal direction A, and for securely holding the inserted card in a held position. The holder includes a main portion 42 generally lying in a plane, a pair of side portions 44, 46 spaced transversely apart along a transverse direction perpendicular to the longitudinal direction, and an end portion 48 (see FIG. 3) extending at least partly along the transverse direction at a closed end 50 of the holder. The opposite end 52 is open to receive the card.

The holder includes a plurality of side mounting portions or side lugs 54, 56 and corner mounting portions or corner lugs 58, 60. Each lug has an opening through which a fastener is inserted to fixedly secure the holder in a housing of a communications equipment. Once the card 10 has been inserted into the open end 52 of the holder until the leading end abuts against the closed end 50 to define the held position, the card and the holder are fixed in position by the fasteners extending through the openings of the lugs 54, 56, 58, 60.

Figure 4:
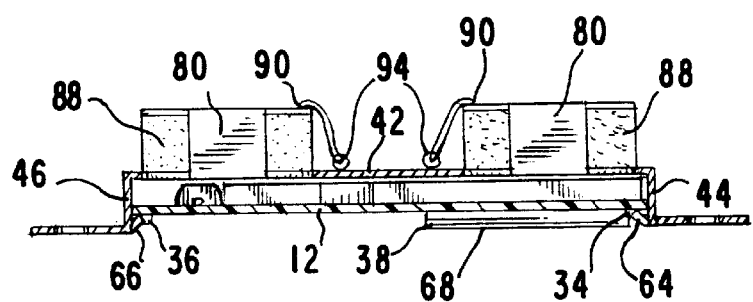
FIG. 4 is a sectional view taken on line 4—4 of FIG. 1 after the introduction of the card.

The holder is constituted of an electrically conductive material, preferably a sheet metal, such as tinned or chromium-plated steel. As shown in FIGS. 2 and 4, the lower edges 64, 66 of the side portions 44, 46 are bent upwardly, and extend at least partly along the longitudinal direction. These lower edges 64, 66 make electro-mechanical contact with the conductive strips 34, 36 on the side edges at the lower surface of the board 12. These strips 34, 36 are electrically grounded so that the main portion 42 serves as an antenna ground plane, as described below.

As shown in FIGS. 2 and 3, the lower edge 68 of the end portion 48 is bent upwardly and extends at least partly along the transverse direction. The lower edge 68 makes electro-mechanical contact with the conductive strip 38 on the leading end at the lower surface of the board. The strip 38 is likewise electrically grounded to insure that the main portion 42 serves as an antenna ground plane.

The holder 40 also has a built-in antenna 70 constituted of the same material as, and being of one-piece with, the holder, for conducting radio frequency signals to and from the card. Antenna 70 is made from the material of the main portion 42. Specifically, a first pair of parallel cuts 72 spaced apart by a predetermined transverse width, a second pair of parallel cuts 74 spaced apart by a greater transverse width, and a pair of inclined cuts 76 located between and connecting the cuts 72, 74 are formed through the main portion 42 and define an antenna portion which is connected to the main portion only at a hinge or fold line 78. The antenna portion is folded about fold line 78 to form a vertical part 80 of a predetermined height, and is folded again about another fold line 82 to form a horizontal part 84 of a predetermined area. The bending of the vertical and horizontal antenna parts 80, 84 out of the plane of the main portion 42 forms therein a cutout 86 of complementary contour to the antenna parts. Vertical part 80 is perpendicular to the main portion 42. Horizontal part 84 is parallel to the main portion 42.

The antenna 70 includes an electrically insulating spacer 88 positioned between the horizontal part 84 and the main portion 42. A cable includes a wire 92 having one end connected to the horizontal part 84 at a feeding point 90, as well as being connected to the main portion 42 at grounding point 94. The opposite end of the wire 92 has an RF connector 96 which is plugged into the antenna connector 30 on the card 10.

Antenna 70 is configured as an inverted F-antenna. The sum of the height of vertical part 80 and the area of horizontal part 84 is equal to $\lambda/4$. The different widths for the parts 80, 84 improve the directivity of the antenna. The usual practice in the design of an F-antenna is to make the height of the vertical part 80 equal to about $\lambda/10$. The grounded main portion 42 serves as the ground plane for the antenna. Antennas, other than F-antennas, can be built into the holder. For example, an inverted L-antenna or a slot antenna can be employed.

In the preferred embodiment, another inverted F-antenna 100 is built into the main portion 42 and is located in a side-by-side relationship with the first antenna 70. The use of two antennas and the selection of the antenna receiving the more power are employed in a diversity circuit on the board 12 for improved reception. The second antenna 100 may be essentially identical in structure and function to the first mentioned antenna 70, and hence, like reference numerals have been omitted from the drawing in order not to encumber the same. An RF connector 102 is plugged into the antenna connector 32 on the card.

However, the second antenna can also be designed to radiate in another polarity or angle as compared to the first antenna. The second antenna can also be different in type, such as an L-antenna, a slot, a dipole, or any other tuned radiating element.

The holder 40 is a unitary piece of sheet material operative for holding the card 10, for grounding the card, for having antennas for transmitting and receiving RF signals, and also for shielding the chips on the card from electromagnetic interference. The form factor of the component 40 is very compact. Antennas are no longer separate components mounted on, or separately connected to, printed circuit boards and accommodated within enclosures, but instead, are built into the card holder.

A resilient tongue or tab 104 is formed by three slits in the main portion 42 between the two antennas. The tongue resiliently bears against the apertured plate 20 to not only insure that the card is snugly held by the holder, but also to insure that the grounded and shielded connection of the holder also extends to the plate 20.

It will be understood that each of the elements described above, or two or more together, also may find a useful application in other types of constructions differing from the types described above.

While the invention has been illustrated and described as embodied in a multi-functional component for holding, shielding, grounding and transmitting/receiving radio frequency signals for a communications equipment card for wireless networks, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

We claim:

1. A component for a radio frequency communications card, comprising:
   a) a holder constituted of an electrically conductive material, for holding and shielding the card from radio frequency interference, the holder having a main portion lying in a plane extending over the card and having a cutout extending through the main portion;
   b) an antenna constituted of the same material as, and being of one-piece with, the holder, for conducting radio frequency signals to and from the card, the antenna being constituted of an antenna portion originally present in the cutout and bent out of the plane of the main portion; and
   c) a grounding contact on the holder for grounding the holder and enabling the plane of the main portion to serve as a ground plane for the antenna.

2. The component of claim 1, wherein the holder includes side portions spaced apart of each other at opposite sides of the main portion and extending over side edges of the card, and mounting portions on the side portions for fixedly mounting the holder.

3. The component of claim 2, wherein the grounding contact is located on the side portions of the holder, for contacting grounded areas on the card.

4. The component of claim 1, wherein the holder, antenna and grounding contact are constituted of a unitary piece of sheet material.

5. The component of claim 1, wherein the antenna portion has a first part extending generally perpendicularly to the ground plane, a second part extending generally parallel to the ground plane, and a feeding point connected to the ground plane and to the second part.

6. The component of claim 5, wherein the first and second parts have different transverse widths.

7. The component of claim 5; and further comprising a spacer constituted of an electrically insulating material and positioned between the second part and the main portion.

8. The component of claim 1, wherein the main portion has another cutout; and further comprising another antenna constituted of another antenna portion originally present in the other cutout and bent out of the plane of the main portion.

9. The component of claim 1; and further comprising a tongue on the main portion, for resiliently bearing against the card.

10. A component for a radio frequency communications card, comprising:
   a) a holder constituted of an electrically conductive material and extending along a longitudinal direction, and operative for receiving the card inserted into the holder along the longitudinal direction, for holding the card in a held position, and for shielding the card from radio frequency interference, the holder having a main portion lying in a plane extending over the card, a cutout extending through the main portion, a pair of side portions spaced apart along a transverse direction perpendicular to the longitudinal direction, and an end portion for abutting the card in the held position;
   b) an antenna constituted of the same material as, and being of one-piece with, the holder, for conducting radio frequency signals to and from the card, the antenna being constituted of an antenna portion originally present in the cutout and bent out of the plane of the main portion; and
   c) a grounding contact on the side portions for grounding the holder and enabling the plane of the main portion to serve as a ground plane for the antenna.

11. The component of claim 10, wherein the antenna portion has a first part extending generally perpendicularly to the ground plane, a second part extending generally parallel to the ground plane, and a feeding point connected to the ground plane and to the second part.

12. The component of claim 11; and further comprising a spacer constituted of an electrically insulating material and positioned between the second part and the main portion.

13. The component of claim 10, wherein the main portion has another cutout; and further comprising another antenna constituted of another antenna portion originally present in the other cutout and bent out of the plane of the main portion.

14. A component for a radio frequency communications card, comprising:
   a) a holder constituted of an electrically conductive material, for holding and shielding the card from radio frequency interference, the holder having a main portion lying in a plane extending over the card and having a cutout extending through the main portion;
   b) an antenna constituted of the same material as, and being of one-piece with, the holder, for conducting radio frequency signals to and from the card, the antenna being constituted of an antenna portion originally present in the cutout and bent out of the plane of the main portion; and
   c) a grounding contact on the holder for grounding the holder and enabling the plane of the main portion to serve as a ground plane for the antenna, the antenna portion having a first part extending generally perpendicularly to the ground plane, a second part extending generally parallel to the ground plane, and a feeding point connected to the ground plane and to the second part.

15. The component of claim 14, wherein the main portion has another cutout; and further comprising another antenna constituted of another antenna portion originally present in the other cutout and bent out of the plane of the main portion.

* * * * *